United States Patent
Abusamra et al.

(10) Patent No.: US 6,820,731 B2
(45) Date of Patent: Nov. 23, 2004

(54) RESILIENT SENSOR FOR SELF-ADJUSTING CLUTCH

(75) Inventors: Muneer Abusamra, Southern Pines, NC (US); Ronald B. Morford, Southern Pines, NC (US)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/094,331

(22) Filed: Mar. 8, 2002

(65) Prior Publication Data

US 2003/0168304 A1 Sep. 11, 2003

(51) Int. Cl.[7] .............................................. F16D 13/75
(52) U.S. Cl. ................................. 192/70.25; 192/30 V
(58) Field of Search ........................... 192/70.25, 30 W, 192/109 A, 111 A, 70.29, 70.3, 30 V

(56) References Cited

U.S. PATENT DOCUMENTS

| | | | | |
|---|---|---|---|---|
| 2,251,366 A | * | 8/1941 | Miller et al. ............. | 192/70.25 |
| 4,189,043 A | | 2/1980 | Steinhagen | |
| 4,291,792 A | * | 9/1981 | Henao ..................... | 192/109 A |
| 4,678,071 A | * | 7/1987 | Ball et al. ................ | 192/109 A |
| 4,696,384 A | * | 9/1987 | Huber ..................... | 192/109 A |
| 4,744,448 A | * | 5/1988 | Maycock et al. ......... | 192/109 A |
| 4,770,282 A | * | 9/1988 | Maycock et al. ......... | 192/109 A |
| 5,205,388 A | * | 4/1993 | Hashimoto et al. ...... | 192/109 A |
| 5,320,205 A | | 6/1994 | Kummer et al. | |
| 5,385,224 A | * | 1/1995 | Uehara .................... | 192/109 A |
| 5,456,345 A | | 10/1995 | Bissett | |
| 5,531,308 A | | 7/1996 | Gochenour et al. | |
| 5,564,541 A | | 10/1996 | Gochenour et al. | |
| 5,564,542 A | | 10/1996 | Gochenour et al. | |
| 5,566,804 A | | 10/1996 | Gochenour et al. | |
| 5,595,274 A | | 1/1997 | Gochenour et al. | |
| 5,595,275 A | | 1/1997 | Gochenour et al. | |
| 6,050,381 A | * | 4/2000 | Uehara et al. ........... | 192/70.25 |
| 6,264,019 B1 | * | 7/2001 | Uehara .................... | 192/70.25 |
| 6,296,099 B1 | * | 10/2001 | Gochenour .............. | 192/70.25 |

* cited by examiner

*Primary Examiner*—Rodney H. Bonck
(74) *Attorney, Agent, or Firm*—Cohen, Pontani, Lieberman & Pavane

(57) ABSTRACT

A clutch is provided including a clutch cover assembly including a cover rotatable about and axis. The pressure plate is spaced apart from the clutch cover assembly and is moveable along the axis for engaging the clutch member. A sleeve including a retainer is moveable along the axis between engaged and disengaged positions. A lever having first and second opposing ends are respectively supported between the container and the clutch cover assembly. The lever includes a fulcrum arranged between first and second ends supported by a portion of the pressure plate. A resilient member is arranged between the portion of the pressure plate and the fulcrum for absorbing vibrational forces transmitted in the direction of the axis.

12 Claims, 1 Drawing Sheet

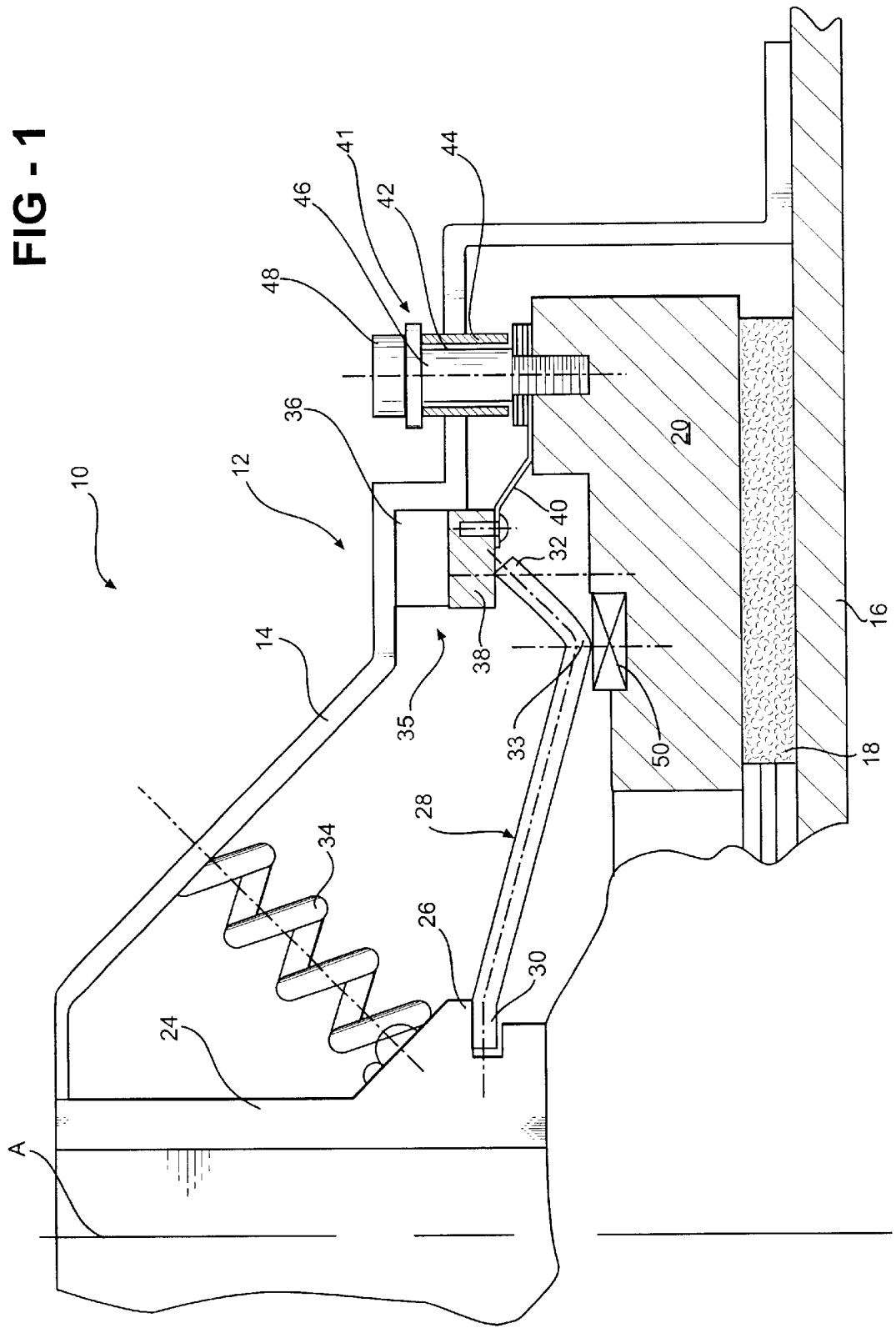

RESILIENT SENSOR FOR SELF-ADJUSTING CLUTCH

BACKGROUND OF THE INVENTION

This invention relates to a self-adjusting clutch, and more specifically, to a sensor assembly adapted to absorb vibrational forces and prevent misadjustment of the clutch.

Clutches are utilized in many vehicle drive applications to selectively transmit or break a drive connection between an engine and a transmission. In one common type of clutch that is widely utilized in heavy vehicles, a clutch includes a pressure plate that rotates with a clutch cover. Levers selectively force the pressure plate against a member that is to be driven to rotate with the pressure plate and clutch cover. When the pressure plate is forced against the driven member, it sometimes must move to accommodate wear on friction surfaces in the clutch. Wear adjustment is typically achieved by using a wear sensor assembly that senses the wear within the clutch. The wear sensor assembly cooperates with an adjustment assembly, such as mating adjusting rings, to adjust the location of the clutch components relative to one another to maintain pedal travel parameters and desired operation of the clutch.

In one very standard way of sensing wear, a pin and bushing arrangement cooperate with one another to adjust the position of the pressure plate relative to the cover in response to an adjustment force. However, vibrational forces may cause the pin and bushing to adjust the position of the pressure plate when adjustment is not needed or prevent proper adjustment. For example, a collision between the trailer and cargo dock may transmit a vibration through the pressure plate that may undesirably adjust the clutch. As a result, the clutch becomes misadjusted and may cause undesirable clutch operation. Therefore, what is needed is a sensor assembly that discriminates between adjustment forces and vibrational forces to prevent misadjustment of the clutch caused by vibrational forces.

SUMMARY OF THE INVENTION AND ADVANTAGES

The present invention provides a clutch comprising a clutch cover assembly including a cover rotatable about and axis. The pressure plate is spaced apart from the clutch cover assembly and is moveable along the axis for engaging the clutch member. A sleeve including a retainer is moveable along the axis between engaged and disengaged positions. A lever having first and second opposing ends are respectively supported between the container and the clutch cover assembly. The lever includes a fulcrum arranged between first and second ends supported by a portion of the pressure plate. The present invention utilizes a resilient member arranged between the portion of the pressure plate and the fulcrum for absorbing vibrational forces transmitted in the direction of the axis.

Accordingly, the above invention provides a sensor assembly that discriminates between adjustment forces and vibrational forces to prevent misadjustment of the clutch caused by vibrational forces.

BRIEF DESCRIPTION OF THE DRAWINGS

Other advantages of the present invention can be understood by reference to the following detailed description when considering connection with the accompanying FIGURE.

DETAILED DESCRIPTION OF THE PREFERRED EMBODIMENT

A clutch is generally indicated at 10 in the Figure. Clutch 10 includes a clutch cover assembly 12 including a cover 14 rotatable about an axis of rotation A. The cover 14 is secured to a flywheel 16 driven by an engine. A pressure plate 20 is disposed within the clutch 10 between the cover 14 and the flywheel 16. A clutch member 18 such as a friction disc is arranged between the pressure plate and the flywheel 16. The friction disc 18 is connection to a transmission, as is known in the art.

The clutch 10 includes a sleeve 24 that is interconnected with a clutch pedal. The clutch pedal may be manipulated by the vehicle operator to move the clutch sleeve 24 along the axis A. The sleeve 24 includes a retainer 26. A plurality of levers 28, typically between 4 and 6, are arranged between the clutch cover assembly 12 and the sleeve 24. Specifically, a first end 30 of the lever 28 is supported by the retainer 26 and a second end 32 opposite the first end 30 is supported against the clutch cover assembly 32. The lever 28 has a fulcrum 33 arranged between the ends 30 and 32. The fulcrum 33 is supported by a portion of the pressure plate 20. A spring 34 such as a diaphragm spring or a coil spring, which is shown in the Figure, is arranged between the cover 14 and the sleeve 24 to move the levers 28 along axis A toward the flywheel 16 to force the pressure plate 20 and friction disc 18 against the flywheel 16 to couple the engine and transmission together to transmit the drive torque from the engine to the transmission.

Many clutches incorporate wear adjustment assemblies to adjust the clutch components as the frication disc 18, pressure plate 20, and other clutch components wear. One type of wear adjustment assembly 35 utilizes a first ramped ring 36 secured to the cover 14. A second complimentary ramped ring 38 mates with the ring 36. Return springs are used between the rings 36 and 38 to bias the rings toward one another to maintain a pre-adjusted wear position. The straps 40 interconnect the pressure plate 20 to the second ring 38 to constrain the pressure plate 20 against rotation so that the pressure plate 20 rotates with the clutch cover assembly 12. In some configurations where other wear assemblies are used or where there is no wear assembly, the straps may be connected from the pressure plate to the clutch cover. The straps 40 move the pressure plate 20 from the engaged position to a disengage position in response to the vehicle operator depressing the clutch pedal.

The wear adjustment assembly 35 works in conjunction with a wear sensor assembly 41 to manipulate a second ring 38 during operation of the clutch to accommodate the clutch 10, as is well known in the art. One type of wear sensor assembly 41 may include a hole 42 in the cover 14 and a bushing 44 press-fitted into the hole 42. A pin 46 may be secured to the pressure plate 20 and extended through the bushing 44 terminating at head 48. As the clutch 10 wears, the head 48 will force the bushing 44 a limited distance through the hole 42 toward the flywheel 16, thereby permitting the second ring 38 to move relative to the first ring 36 and moving the second ring 38 further from the cover 14.

Vibrations internal and external to the clutch 10 may result in misadjustment of the clutch. For example, a collision between the trailer and a cargo loading and unloading dock may transmit a vibration through the pressure plate that may undesirably adjust the clutch 10 by manipulating the wear adjustment 35 and the wear sensor assembly 41. The present invention utilizes a resilient member 50 between the fulcrum 34 and the pressure plate 20 to absorb such a vibrational force along the axis A. The spring rate of the resilient member 50 may be determined by such parameters as the total number of levers, the type of return springs between the rings 36 and 38, the coefficient of friction between the rings 36 and 38, the vibrational inputs typically experience within the clutch, and any other relevant parameters. The resilient member may be an elastomeric material, a coil or other spring, a Belleville washer, a wave spring, or any other suitable resilient member.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A clutch comprising:
    a clutch cover assembly including a cover rotatable about an axis;
    a clutch member located in the cover;
    a pressure plate spaced apart from said clutch cover assembly and movable along said axis for engaging said clutch member;
    a sleeve including a retainer movable along said axis between engaged and disengaged positions;
    a lever having first and second opposing ends respectively supported between said retainer and said clutch cover assembly;
    a fulcrum in said lever said fulcrum arranged between said first and second ends and supported by a portion of said pressure plate;
    a resilient member arranged between said portion of said pressure plate and said fulcrum for absorbing vibrational forces transmitted in the direction of said axis;
    a wear sensor assembly arranged between said pressure plate and said clutch cover assembly;
    a wear adjustment assembly arranged between said pressure plate and said clutch cover assembly, said wear adjustment assembly structured to adjust its position towards the clutch member via a connection from the wear sensor assembly as said clutch wears; and
    wherein as said resilient member is structured to absorb said vibrational forces transmitted in the direction of said axis, said wear adjustment assembly is not moved out of adjustment by said vibrational forces transmitted in the direction of said axis.

2. The clutch according to claim 1, wherein said wear sensor assembly includes a bushing in a hole in said cover, spaced from said axis, and a pin attached to said pressure plate, extending through said bushing.

3. The clutch according to claim 1, wherein said clutch cover assembly includes a wear adjuster arranged between said second end and said cover, for moving said second end away from said cover during clutch wear.

4. The clutch according to claim 3, wherein flexible clutch straps interconnect said wear adjuster and said pressure plate, constraining said pressure plate and said wear adjuster against relative motion about said rotation axis, and permitting movement of said pressure plate along said axis.

5. The clutch according to claim 1, wherein a plurality of levers and a corresponding plurality of resilient members are arranged about said axis, arcuately spaced from one another.

6. The clutch according to claim 1, wherein said resilient member is an elastic material.

7. The clutch according to claim 1, wherein said resilient member is a coil spring.

8. The clutch according to claim 1, wherein said resilient member is a Belleville washer.

9. The clutch according to claim 1, wherein said resilient member is a wave spring.

10. A method of adjusting a clutch, said method comprising:
    a) providing a lever arranged between a clutch assembly and a sleeve retainer with a fulcrum supported on a pressure plate;
    b) providing a resilient member between said lever fulcrum and said pressure plate; and
    c) absorbing vibrational forces with said resilient member to prevent misadjustment of the clutch;
    d) providing a wear adjustment assembly, arranged between said pressure plate and said clutch cover assembly, said wear adjustment assembly structured to adjust and move as said clutch wears wherein as said resilient member is structured to absorb said vibrational forces transmitted in the direction of said axis, said wear adjustment assembly is not moved out of adjustment by said vibrational forces transmitted in the direction of said axis.

11. The method according to claim 10, further including the step of providing a wear sensor assembly arranged between the pressure plate and the clutch cover assembly.

12. The method according to claim 10, further including the step of providing a wear adjuster arranged between the lever and a cover of said clutch assembly.

* * * * *